Feb. 3, 1959
R. S. DAVIS
2,872,040
EGG GRADING MACHINE
Filed March 12, 1956
5 Sheets-Sheet 1
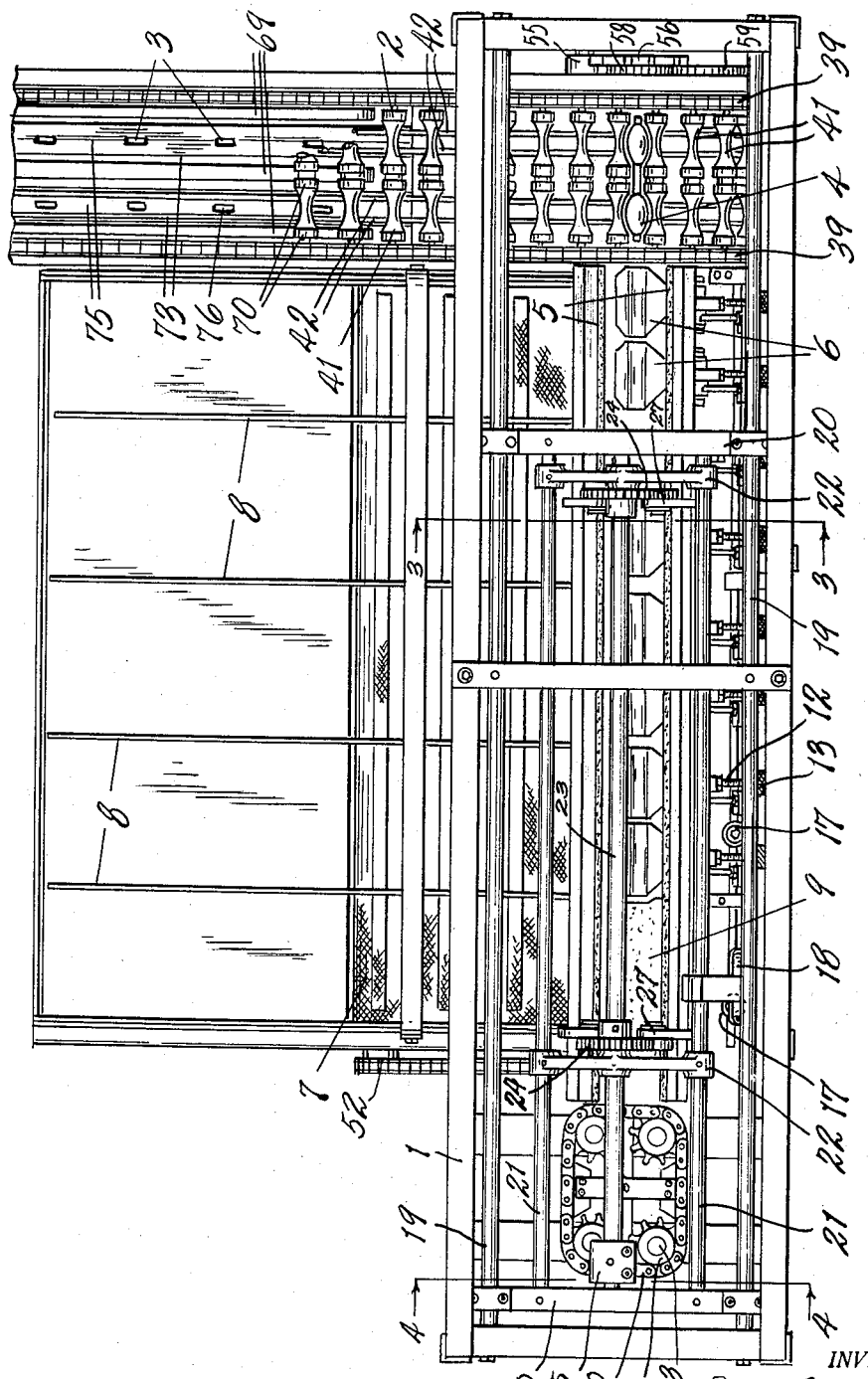
FIG.1.
INVENTOR.
Roy S. Davis
BY
Attorney.

Feb. 3, 1959
R. S. DAVIS
2,872,040
EGG GRADING MACHINE
Filed March 12, 1956
5 Sheets-Sheet 2
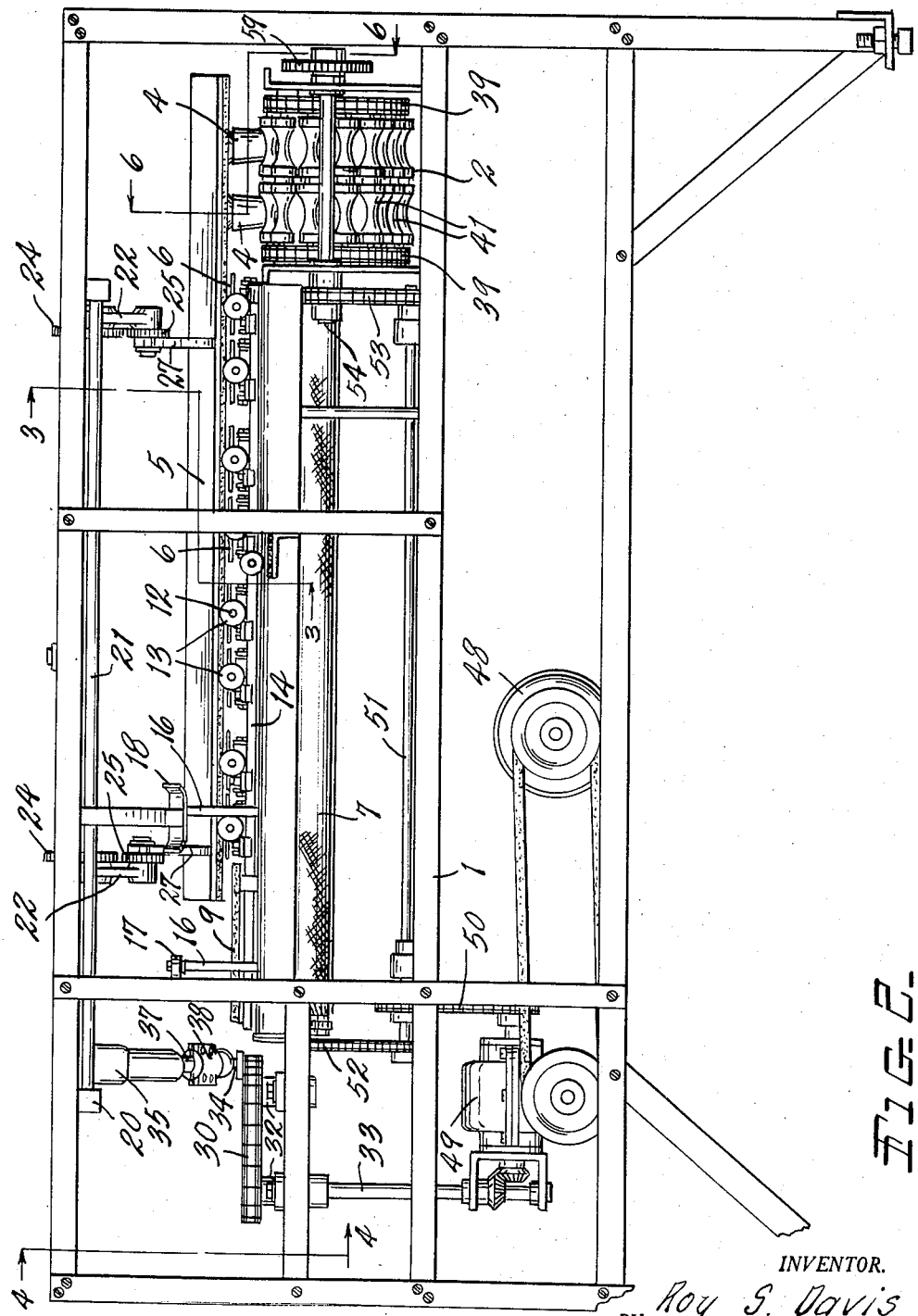
FIG. 2.
INVENTOR.
Roy S. Davis
BY
Attorney.

INVENTOR.
Roy S. Davis

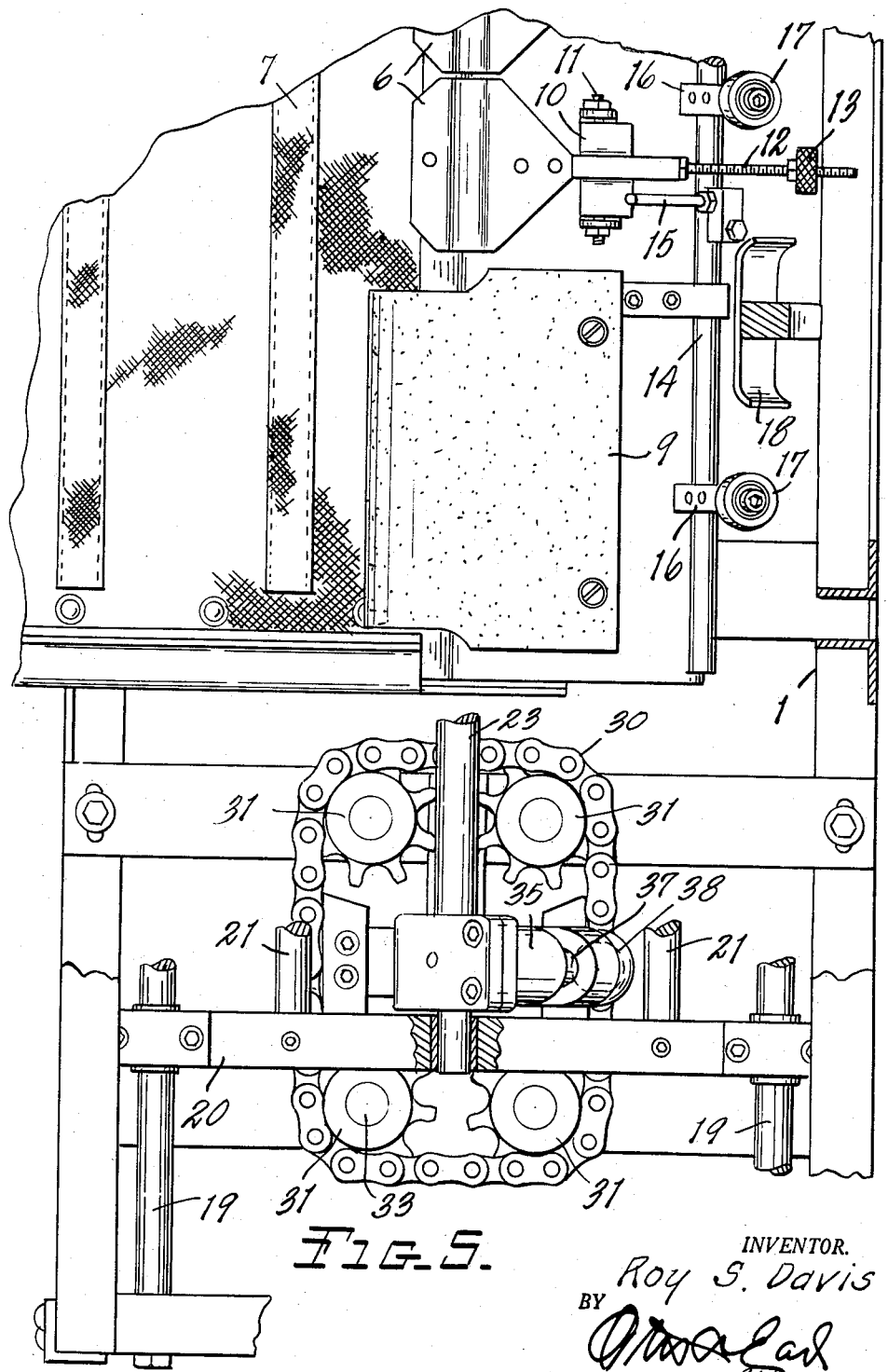

Feb. 3, 1959
R. S. DAVIS
2,872,040
EGG GRADING MACHINE
Filed March 12, 1956
5 Sheets-Sheet 5
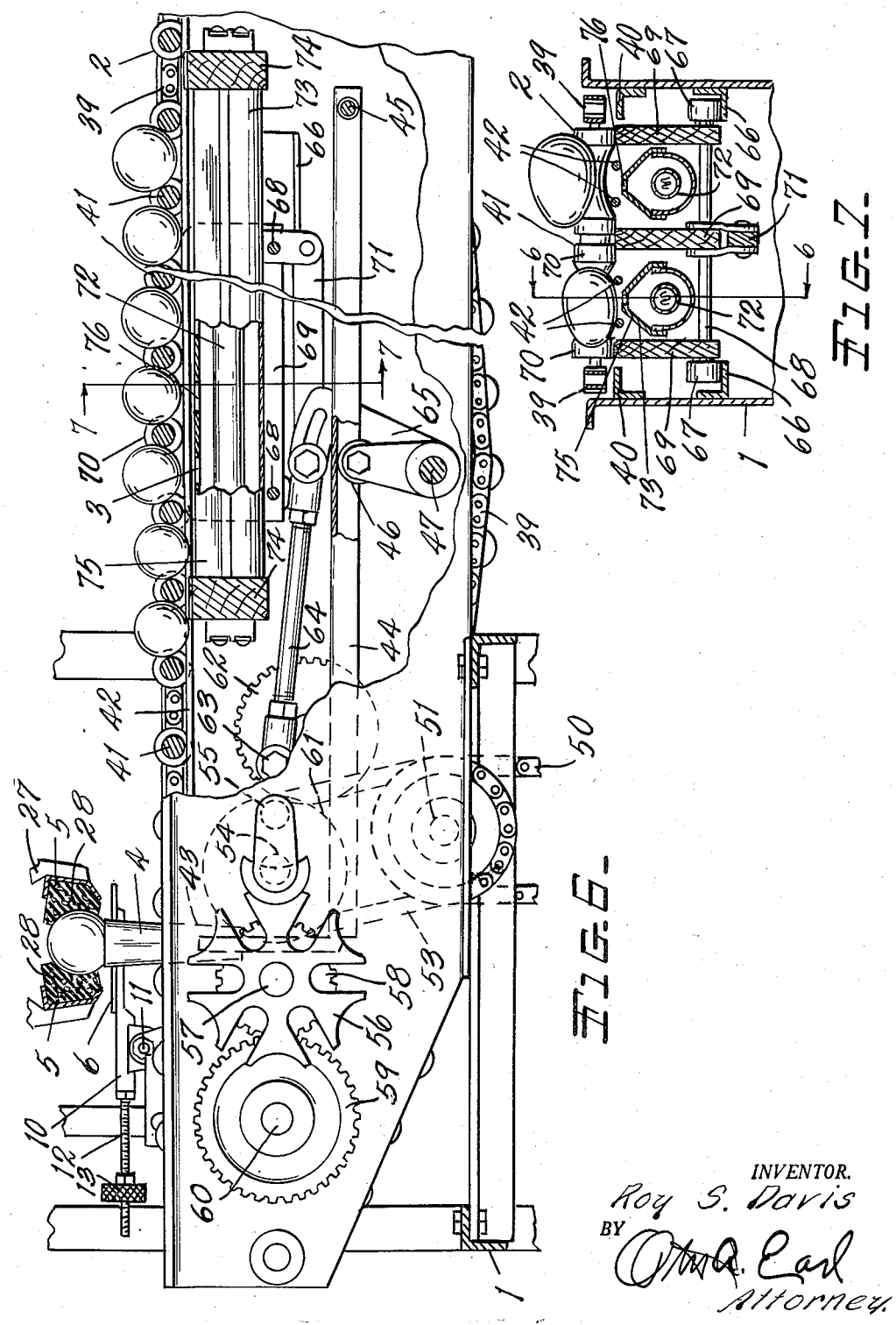
INVENTOR.
Roy S. Davis
BY
Attorney.

United States Patent Office 2,872,040
Patented Feb. 3, 1959

2,872,040
EGG GRADING MACHINE
Roy S. Davis, Otsego, Mich.

Application March 12, 1956, Serial No. 570,874

17 Claims. (Cl. 209—121)

This invention relates to improvements in egg grading machine.

The principal objects of this invention are:

First, to provide a novel form of advancing mechanism for smoothly and positively advancing a plurality of eggs along a line of scale pans for successively weighing the eggs until the eggs are discharged by the pans according to their weight.

Second, to provide egg advancing mechanism with jaws that are positively opened and closed with a predetermined gripping pressure on the eggs prior to any longitudinal transferring motion of the jaws and eggs.

Third, to provide actuating mechanism for transversely opening and closing and longitudinally reciprocating article handling jaws which mechanism does not permit any slack or lost motion between the transverse opening and closing and the longitudinal shifting motion of the jaws.

Fourth, to provide a novel feed mechanism for delivering eggs to advancing jaws which will first move the eggs over sources of candling light with a rolling or rocking motion of the eggs to facilitate candling inspection of the eggs.

Fifth, to provide article advancing mechanism which will grip, advance and release fragile articles rapidly with predetermined gripping forces and which has no connection in the mechanism for gripping the articles that may become loosened with use to change the gripping force as applied to the articles.

Other objects and advantages of the invention will be apparent from a consideration of the following description and claims. The drawings of which there are five sheets illustrate a highly practical form of the egg grading machine.

Fig. 1 is a fragmentary top plan view of the machine with the egg advancing jaws and mechanism in advanced position.

Fig. 2 is a fragmentary side elevational view of the machine.

Fig. 5 is an enlarged fragmentary plan view of the drive connections to the egg advancing jaws with parts broken away in cross section.

Fig. 6 is a fragmentary end elevational view of the delivery conveyor to the egg advancing mechanism partially broken away in vertical cross section along the line 6—6 in Figs. 2 and 7.

Fig. 7 is a fragmentary transverse cross sectional view taken along the plane of the line 7—7 in Fig. 6.

Figure 3:
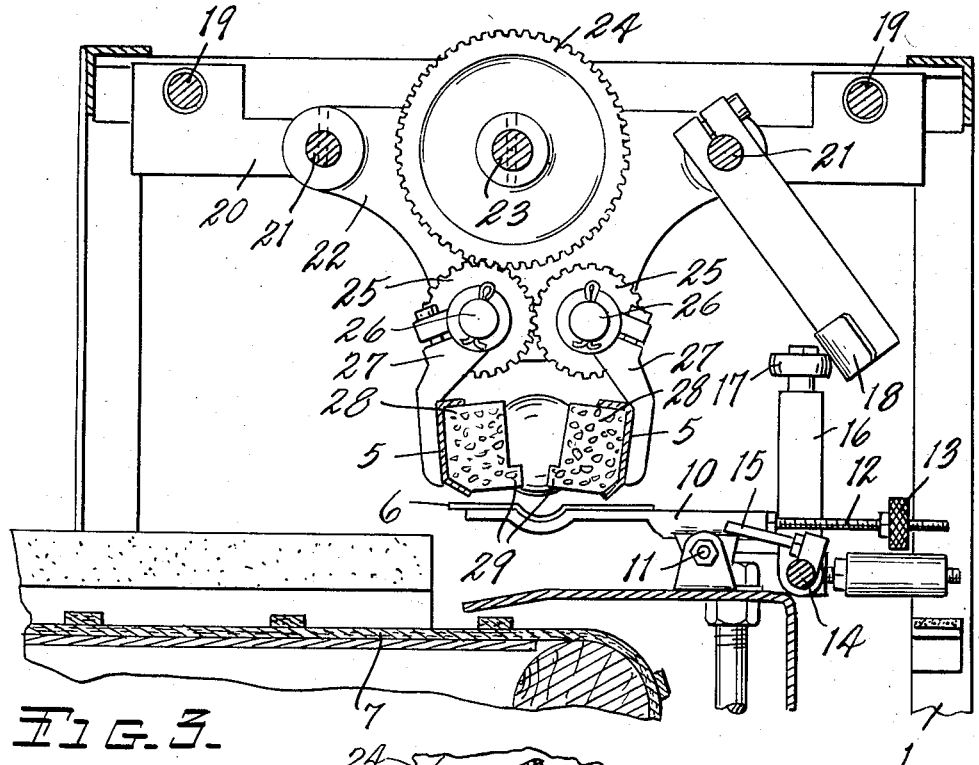
Fig. 3 is a fragmentary transverse cross sectional view taken along the plane of the line 3—3 in Figs. 1 and 2.
Figure 4:
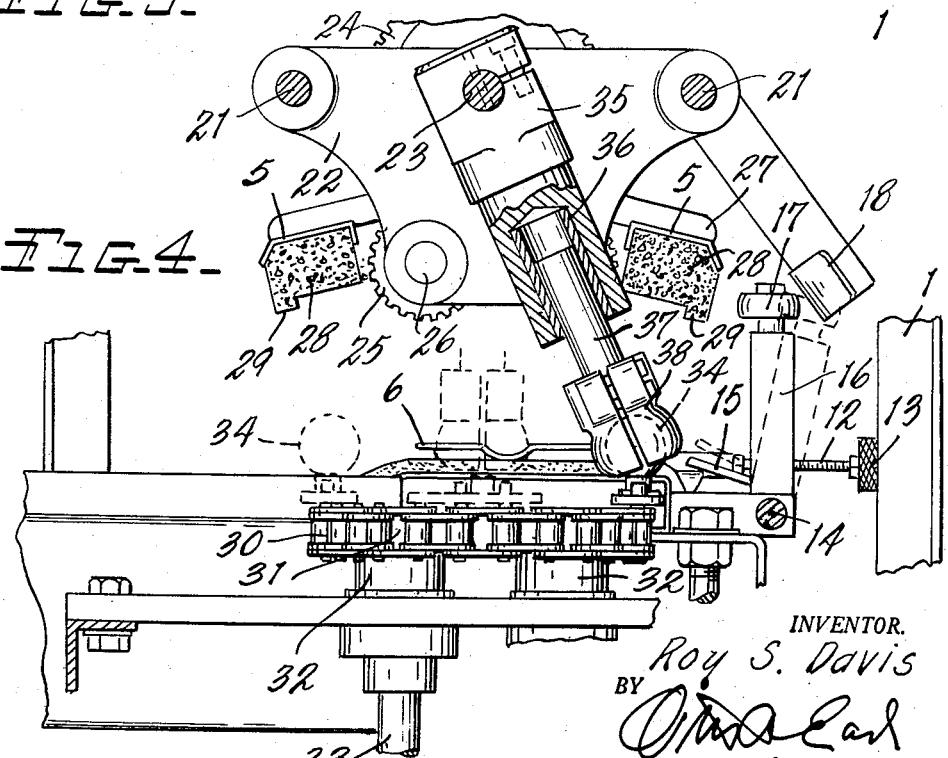
Fig. 4 is a fragmentary transverse cross sectional view taken along the plane of the line 4—4 in Figs. 1 and 2.

The egg grading machine of the present invention is designed to rapidly grade eggs by weight and includes a delivery conveyor which permits candling inspection of the eggs as they are delivered to the grading mechanism. The graded eggs are delivered in separate groups according to weight. The machine includes a suitable framework indicated in its entirety at 1 which supports the operating elements of the machine.

At the inlet or supply end of the machine is a delivery conveyor generally indicated at 2 that advances eggs over light holes 3 for candling inspection and onto an elevator 4 for elevation into the reach of elongated parallel advancing jaws 5. The jaws 5 open and close transversely to grip and release the eggs and reciprocate longitudinally to advance the eggs along a line of scale pans 6. In the example illustrated the pans 6 are arranged in pairs so that two eggs can be graded in each class simultaneously. The scale pans are supported by scale mechanism to be described in greater detail and function to tilt and discharge eggs of predetermined weight. The discharged eggs are received on a transversely moving discharge apron or belt 7 having divider rails 8 extending therealong to segregate the eggs according to the weights as determined by the scales. Obviously the scales adjacent to the elevator 4 will be adjusted to the heaviest grade classification desired so that eggs that are not heavy enough to actuate the first scales will remain on the scale pans to be advanced along successive scales of decreasing weight adjustment until all eggs have been classified by weight. An underweight receiving station is positioned underneath the jaws beyond the last scale pan as at 9 to receive eggs that are too light to actuate any of the scale mechanisms.

More specifically considering the scale mechanism attention is directed to Figs. 3 and 5 in which the scale pans 6 are shown to be supported on scale beams 10 pivoted at 11 and provided with screw arms 12 with counterweight nuts 13 adjustably threaded thereon. Extending along the line of scales is a steady shaft 14 having a plurality of locking arms 15 projecting therefrom over a portion of the beams 10. The steady shaft 14 carries a pair of operating lever arms 16 with rollers 17 on the upper end thereof and these rollers 17 are adapted to be engaged by a cam 18 to rock the steady shaft and lock the scale pans in elevated position as the jaws 5 are opened and closed. The operation of the cam 18 will be described in greater detail presently.

The mechanism for supporting and actuating the jaws 5 is illustrated most clearly in Figs. 1 to 5. The framework 1 supports a pair of longitudinally extending laterally spaced slide bars 19 above the line of scale pans. Slidably supported on the slide bars is a carriage consisting of end crossbars 20 and longitudinally extending laterally spaced side bars 21 and fixedly secured to the side bars 21 are a pair of crossheads 22. The crossheads 22 and the crossbars 20 rotatably support a longitudinally extending central rock shaft 23. Pinned to the rock shaft in opposed thrust engagement with the inner sides of the crossheads 22 are a pair of gears 24 so that reciprocating motion or force applied to the rock shaft will impart longitudinal reciprocating motion to the crossheads and the carriage generally.

Positioned below the gears 24 on the crossheads 22 are a pair of meshing gears 25 one of which is meshed with the adjacent gear 24. Thus angular oscillating motion imparted to the rock shaft 23 will be transmitted through the gears 24 to the meshing gears 25. The gears 25 are mounted on and connected to longitudinally extending parallel jaw actuating shafts 26. The shafts 26 carry radially projecting jaw support arms 27 that are connected to the jaws 5. The jaws 5 are provided with resilient facings 28 of sponge rubber or the like and with particular reference to Figs. 3 and 4 it will be noted that the facings are provided with inwardly projecting lower edges 29. Due to the lateral spacing of the actuating shafts 26 the jaw facings 28 and their projecting lower edges 29 close upon each other with a slight upward motion so as to lift the eggs or other articles slightly above the scale pans 6. The jaws open wide as in Fig. 4 so as not to obstruct the discharge of eggs from the pans 6.

The rock shaft 23 and its carriage project beyond the line of scale pans to over a chain loop 30. The chain loop is supported in a horizontal rectangular pattern by four sprockets 31, the sprockets being carried by suitable bearings 32 on a portion of the framework 1. One of the sprockets 31 is driven continuously by a depending shaft 33. Secured to one link of the chain loop 30 is an upstanding stud having a ball shaped end 34. Obviously the stud 34 will traverse a generally rectangular path as it rotates with the chain loop 30. Fixedly secured to the rock shaft 23 above the chain loop 30 is a crank arm 35 having a tubular lower end with a bearing sleeve 36 therein. The bearing sleeve 36 slidably receives the upper end of the connecting rod 37 and the lower end of the connecting rod 37 carries a socket connection 38 forming a universal joint connection with the stud 34.

As the chain loop 30 is rotated in a counter clockwise direction as indicated in Fig. 5 the crank arm 35 and connecting rod 37 will be given a counter clockwise rotation across the outer end of the chain loop removed from the scale pans and this motion will result in opening motion of the jaws 5. Retracting motion of the stud 34 along the right hand side of the chain loop moves the rock shaft 23 and the entire carriage in a retracting motion with the jaws open until the inner ends of the jaws are positioned over the elevator 4. The stud 34 and crank arm 35 then move to the left across the inner end of the chain loop to close the jaws on eggs supported on the elevator and any eggs remaining ungraded on the scale pans. The stud 34 and crank arm 35 then move outwardly or downwardly as appears in Fig. 5 along the left reach of the chain loop to advance the carriage and the closed jaws. It will be noted that the transverse opening and closing of the jaws is entirely independent of the longitudinal motion of the jaws because the two motions are created by movement of the stud 34 along different portions of the chain loop 30.

The previously mentioned locking cams 18 are carried by one of the side bars 21 and reciprocate with the carriage and the jaws. The rollers 17 and rocking levers 16 are positioned longitudinally on the steady shaft 14 to be engaged by the cam 18 at the ends of the longitudinal motion of the carriage and the jaws. Thus the scale pans 6 will be locked in raised position during the intervals in which the jaws are opening or closing over the scale pans but will be free to operate in weighing action while the jaws are retracting in open position. The advancing mechanism can thus operate quite rapidly as there is little shock incident to the reversing motion of the carriage and jaws and since the closing pressure of the jaws is at all times fixed by the constant lateral throw of the crank arm 35 and stud 34.

The details of the drive connections and delivery conveyor are most clearly shown in Figs. 1, 2, 6 and 7. The delivery conveyor 2 consists of a pair of chain loops 39 supported upon angular rails 40 (see Fig. 7) and driven by suitable sprockets not illustrated. Extending between the chain loops 39 are flight bars 41 having hour-glass shapes to receive the eggs between the flight bars. Eggs that are small enough to pass between adjacent flight bars are supported upon parallel slide wires 42.

The elevator 4 consists of upright plungers 43 adapted to reciprocate between the flight bars and connected on their lower ends to a long lever beam 44, the lever beam being pivotally supported at 45 (see Fig. 6). The lever beam 44 is oscillated up and down by a cam 46 carried by the rock shaft 47. The motor 48 shown in Fig. 2 drives gearing in a gear box 49 to drive the previously mentioned shaft 33 to the chain loop 30 and also to drive a chain 50 to the lay shaft 51. A chain 52 drives the apron 7 from the lay shaft and a chain 53 drives the cross shaft 54. The cross shaft 54 carries a crank pin 55 which intermittently engages and drives the star wheel 56. The star wheel 56 is on a shaft 57 with the gear 58 that drives the gear 59 on the shaft 60 that intermittently drives the delivery conveyor chains 39. The shaft 54 also carries a gear that continuously drives the crank gear 62. A crank pin 63 on the crank gear 62 is connected by the connecting rod 64 to a crank arm 65 on the rock shaft 47. This oscillates the cam 46 to operate the elevator in timed relation to the conveyor.

In order to facilitate candling inspection of the eggs being delivered to the elevator and the grading mechanism those portions of the frame 1 which support the chain loops 39 are provided with rails 66 (see Fig. 7) supporting rollers 67 on the ends of two shafts 68. The shafts 68 support three rails 69 that project upwardly and engage and support cylindrical rims 70 on the flight bars 41. The rails 69 coact with the rims 70 to support the flight bars slightly above the level of the chain supporting rails 40 for a short distance. A link 71 connects the center support rail 69 to the previously mentioned lever arm 65 so that the rails 69 are oscillated longitudinally by rotation of the crank gear 62. Thus the eggs are rolled or oscillated back and forth while being advanced by the chains 39 over the support rails 69.

Positioned between the support rails 69 and below the flight bars 41 are neon light tubes 72 enclosed in housings 73 and supported by wooden crossbars 74. The removable covers 75 of the housings are provided with spaced light ports 76 directed upwardly to the under sides of the eggs on the supply conveyor. It has been found that oscillating rolling motion of the eggs over the light ports permits more rapid and accurate candling inspection of the eggs than would the steady passage of eggs over an upper light. After passing the candling light and the support rails 69 the chain loops 39 are returned to the support rails 40 to continue advancing the flight bars and eggs past the elevator 4.

Having thus described the invention, what is claimed as new and is desired to be secured by Letters Patent is:

1. In an egg grading machine having a plurality of weighing scales with aligned scale pans arranged in pairs to weigh and discharge eggs of different weights, means for advancing eggs in pairs along said line of pans comprising a frame supporting said scales and including a pair of slide bars extending longitudinally in laterally spaced relation above the line of said pans, a carriage including cross bars slidably supported on said slide bars, longitudinal side bars on said carriage with cross heads extending therebetween, a longitudinal rock shaft rotatably mounted in said cross heads and having gears secured to the shaft in opposed thrust engagement with the cross heads, a pair of jaw operating shafts rotatably mounted in said cross heads, gears on the ends of said operating shafts meshed with each other, the gears on one operating shaft being meshed with the gears on said rock shaft, jaw arms projecting from said operating shafts, elongated jaws with opposed cushioned faces carried on said jaw arms over said pans for lateral opening and closing motion with respect to eggs on the pans, sprockets mounted on said frame and supporting a chain in a horizontal rectangular loop at one end of said line of pans, a stud carried by said chain loop, a crank arm fixedly secured to said rock shaft, a connecting rod telescopically engaged with said crank arm and having a universal joint connection with said stud, means connected to rotate said chain loop, said jaws projecting oppositely from said chain loop beyond said line of pans in the retracted position of said carriage to over a supply station, means for delivering eggs in pairs to said supply station including a conveyor having hour glass shaped flights, means connected to advance said conveyor in timed relation to said chain loop, an elevator reciprocable vertically between said flights at said supply station, means connected to actuate said elevator in timed relation to said chain loop, candling lights positioned under a reach of said conveyor, support rails supporting said flights independently of said conveyor over said lights, and means connected to oscillate said support rails to rotate said flights and eggs supported thereby over said lights.

2. In an egg grading machine having a plurality of weighing scales with aligned scale pans arranged to weigh and discharge eggs of different weights, means for advancing eggs along said line of pans comprising a frame supporting said scales and including a pair of slide bars extending longitudinally in laterally spaced relation above the line of said pans, a carriage including cross bars slidably supported on said slide bars, longitudinal side bars on said carriage with cross heads extending therebetween, a longitudinal rock shaft rotatably mounted in said cross heads and having gears secured to the shaft in opposed thrust engagement with the cross heads, a pair of jaw operating shafts rotatably mounted in said cross heads, gears on the ends of said operating shafts meshed with each other, the gears on one operating shaft being meshed with the gears on said rock shaft, jaw arms projecting from said operating shafts, elongated jaws with opposed cushioned faces carried on said jaw arms over said pans for lateral opening and closing motion with respect to eggs on the pans, sprockets mounted on said frame and supporting a chain in a horizontal rectangular loop at one end of said line of pans, a stud carried by said chain loop, a crank arm fixedly secured to said rock shaft, a connecting rod telescopically engaged with said crank arm and having a universal joint connection with said stud, means connected to rotate said chain loop, said jaws projecting oppositely from said chain loop beyond said line of pans in the retracted position of said carriage to over a supply station, and means for delivering eggs to said supply station.

3. In an egg grading machine having a plurality of weighing scales with aligned scale pans arranged to weigh and discharge eggs of different weights, means for advancing eggs along said line of pans comprising a frame supporting said scales and including a slide extending longitudinally along the line of said pans, a carriage slidably supported on said slide, cross members on said carriage, a longitudinal rock shaft rotatably mounted in said cross members and having opposed thrust engagement with the carriage, gears on said rock shaft, a pair of jaw operating shafts rotatably mounted in said cross members, gears on the ends of said operating shafts meshed with each other, the gears on one operating shaft being meshed with the gears on said rock shaft, jaw arms projecting from said operating shafts, elongated jaws with opposed cushioned faces carried on said jaw arms over said pans for lateral opening and closing motion with respect to eggs on the pans, means supporting a horizontal rectangularly looped flexible drive member at one end of said line of pans, a stud carried by said looped member, a crank arm fixedly secured to said rock shaft, a connecting rod axially slidably engaged with said crank arm and having a universal joint connection with said stud, means connected to rotate said looped member, said jaws projecting oppositely from said loop beyond said line of pans in the retracted position of said carriage to over a supply station, means for delivering eggs to said supply station including a conveyor having flights, means connected to advance said conveyor in timed relation to said loop, an elevator reciprocable vertically between said flights at said supply station, means connected to actuate said elevator in timed relation to said loop, candling lights positioned under a reach of said conveyor, support rails supporting said flights independently of said conveyor over said lights, and means connected to oscillate said support rails to rotate said flights and eggs supported thereby over said lights.

4. In an egg grading machine having a plurality of weighing scales with aligned scale pans arranged to weigh and discharge eggs of different weights, means for advancing eggs along said line of pans comprising a frame supporting said scales and including a slide extending longitudinally along the line of said pans, a carriage slidably supported on said slide, cross members on said carriage, a longitudinal rock shaft rotatably mounted in said cross members and having opposed thrust engagement with the carriage, gears on said rock shaft, a pair of jaw operating shafts rotatably mounted in said cross members, gears on the ends of said operating shafts meshed with each other, the gears on one operating shaft being meshed with the gears on said rock shaft, jaw arms projecting from said operating shafts, elongated jaws with opposed cushioned faces carried on said jaw arms over said pans for lateral opening and closing motion with respect to eggs on the pans, means supporting a horizontal rectangularly looped flexible drive member at one end of said line of pans, a stud carried by said looped member, a crank arm fixedly secured to said rock shaft, a connecting rod axially slidably engaged with said crank arm and having a universal joint connection with said stud, means connected to rotate said looped member, said jaws projecting oppositely from said loop beyond said line of pans in the retracted position of said carriage to over a supply station, and means for delivering eggs to said supply station.

5. In an egg grading machine having a plurality of weighing scales with aligned scale pans arranged to weigh and discharge eggs of different weights, means for advancing eggs in pairs along said line of pans comprising a frame supporting said scales and including a slide extending longitudinally along the line of said pans, a carriage slidably supported on said slide, cross members on said carriage, a longitudinal rock shaft rotatably mounted in said cross members and having opposed thrust engagement with the carriage, a gear on said rock shaft, a pair of jaw operating shafts rotatably mounted in said cross members, gears on said operating shafts meshed with each other, the gear on one operating shaft being meshed with the gear on said rock shaft, jaw arms projecting from said operating shafts, elongated jaws with opposed cushioned faces carried on said jaw arms over said pans for lateral opening and closing motion with respect to eggs on the pans, means supporting a horizontal rectangularly looped flexible drive member at one end of said line of pans, a stud carried by said looped member, a crank arm fixedly secured to said rock shaft, a connecting rod axially slidably engaged with said crank arm and having a universal joint connection with said stud, means connected to rotate said looped member, said jaws projecting oppositely from said looped drive member beyond said line of pans in the retracted position of said carriage to over a supply station, means to lock said scale pans in raised inoperative position and including a swingable operating member, cam means reciprocable with said carriage and engageable with said operating member while said carriage is at the ends of its longitudinal travel, means for delivering eggs to said supply station including a conveyor having flights, means connected to advance said conveyor in timed relation to said loop, an elevator reciprocable vertically between said flights at said supply station, means connected to actuate said elevator in timed relation to said loop, candling lights positioned under a reach of said conveyor, support rails supporting said flights independently of said conveyor over said lights, and means connected to oscillate said support rails to rotate said flights and eggs supported thereby over said lights.

6. In an egg grading machine having a plurality of weighing scales with aligned scale pans arranged to weigh and discharge eggs of different weights, means for advancing eggs in pairs along said line of pans comprising a frame supporting said scales and including a slide extending longitudinally along the line of said pans, a carriage slidably supported on said slide, cross members on said carriage, a longitudinal rock shaft rotatably mounted in said cross members and having opposed thrust engagement with the carriage, a gear on said rock shaft, a pair of jaw operating shafts rotatably mounted in said cross members, gears on said operating shafts meshed with each other, the gear on one operating shaft being meshed with the gear on said rock shaft, jaw arms projecting from said operating shafts, elongated jaws with opposed cushioned faces carried on said jaw arms over said pans for lateral opening and closing motion with respect to eggs on the pans, means supporting a horizontal rectangularly looped flexible drive member at one end of said line of pans, a stud carried by said looped member, a crank arm fixedly secured to said rock shaft, a connecting rod axially slidably engaged with said crank arm and having a universal joint connection with said stud, means connected to rotate said looped member, said jaws projecting oppositely from said looped drive member beyond said line of pans in the retracted position of said carriage to over a supply station, means to lock said scale pans in inoperative position and including a swingable operating member, cam means reciprocable with said carriage and engageable with said operating member while said carriage is at the ends of its longitudinal travel, and means for delivering eggs to said supply station.

7. In an article grading machine having a plurality of weighing scales with alined scale pans arranged to weigh and discharge articles of different weights, means for advancing articles along said line of pans comprising a frame supporting said scales and including a slide extending longitudinally along the line of said pans, a carriage slidably supported on said slide bars, cross members on said carriage, a longitudinal rock shaft rotatably mounted in said cross members and having opposed thrust engagement with the carriage, a gear on said rock shaft, a pair of jaw operating shafts rotatably mounted in said cross members, gears on said operating shafts meshed with each other, the gear on one operating shaft being meshed with the gear on said rock shaft, jaw arms projecting from said operating shafts, elongated jaws with opposed cushioned faces carried on said jaw arms over said pans for lateral opening and closing motion with respect to articles on the pans, means supporting a horizontal rectangularly looped flexible drive member at one end of said line of pans, a stud carried by said looped member, a crank arm fixedly secured to said rock shaft a connecting rod axially slidably engaged with said crank arm and having a universal joint connection with said stud, means connected to rotate said looped drive member, said jaws projecting oppositely from said loop beyond said line of pans in the retracted position of said carriage to over a supply station, means to lock said scale pans in inoperative position and including an operating member, cam means reciprocable with said carriage and engageable with said operating member while said carriage is at the ends of its longitudinal travel, and means for delivering articles to said supply station including a conveyor having flights, means connected to advance said conveyor in timed relation to said looped drive member, an elevator reciprocable vertically between said flights at said supply station, and means connected to actuate said elevator in timed relation to said looped drive member.

8. In an article grading machine having a plurality of weighing scales with aligned scale pans arranged to weigh and discharge articles of different weights, means for advancing articles along said line of pans comprising a frame supporting said scales and including a slide extending longitudinally along the line of said pans, a carriage slidably supported on said slide, a longitudinal rock shaft rotatably mounted in said carriage and secured in opposed thrust engagement with the carriage, a gear on said rock shaft, a pair of jaw operating shafts rotatably mounted in said carriage, gears on said operating shafts meshed with each other, the gear on one operating shaft being meshed with the gear on said rock shaft, jaw arms projecting from said operating shafts, elongated jaws with opposed cushioned faces carried on said jaw arms over said pans for lateral opening and closing motion with respect to articles on the pans, means supporting a horizontal rectangularly looped flexible drive member at one end of said line of pans, a stud carried by said looped member, a crank arm fixedly secured to said rock shaft, a connecting rod axially slidably engaged with said crank arm and having a universal joint connection with said stud, means connected to rotate said loop, said jaws projecting oppositely from said loop beyond said line of pans in the retracted position of said carriage to over a supply station, means arranged to lock said scale pans in operative position and including a movable actuating member, means carried by said carriage and reciprocable therewith to engage and actuate said actuating member while said carriage is at the ends of its longitudinal travel, and means for delivering articles to said supply station.

9. In a article grading machine having a plurality of weighing scales with aligned scale pans arranged to weigh and discharge articles of different weights, means for advancing articles along said line of pans comprising a frame supporting said scales and including a slide extending longitudinally along the line of said pans, a carriage slidably supported on said slide, a longitudinal rock shaft rotatably mounted in said carriage and secured in opposed thrust engagement with the carriage, a gear on said rock shaft, a pair of jaw operating shafts rotatably mounted in said carriage, gears on said operating shafts meshed with each other, the gear on one operating shaft being meshed with the gear on said rock shaft, jaw arms projecting from said operating shafts, elongated jaws with opposed faces carried on said jaw arms over said pans for lateral opening and closing motion with respect to articles on the pans, means supporting a horizontal rectangularly looped flexible drive member at one end of said line of pans, a stud carried by said looped member, a crank arm fixedly secured to said rock shaft, a connecting rod axially slidably engaged with said crank arm and having a universal joint connection with said stud, means connected to rotate said loop, said jaws projecting oppositely from said loop beyond said line of pans in the retracted position of said carriage to over a supply station, means arranged to lock said scale pans in operative position and including a movable actuating member, means carried by said carriage and reciprocable therewith to engage and actuate said actuating member while said carriage is at one end of its longitudinal travel, and means for delivering articles to said supply station.

10. In an article grading machine having a plurality of grading devices with aligned pans arranged to grade and discharge articles of different grades, means for advancing articles along said line of pans comprising a frame supporting said devices and including a slide extending longitudinally along the line of said pans, a carriage slidably supported on said slide, a longitudinal rock shaft rotatably mounted in said carriage and secured in opposed thrust engagement with the carriage, a gear on said rock shaft, a pair of jaw operating shafts rotatably mounted on said carriage, gears on said operating shafts meshed with each other, the gears on said rock shaft being drivingly engaged with one of said operating shafts, jaw arms projecting from said operating shafts, elongated jaws with opposed faces carried on said jaw arms over said pans for lateral opening and closing motion with respect to articles on the pans, means supporting a horizontal rectangularly looped flexible drive member at one end of said line of pans, a stud carried by said looped member, a crank arm fixedly secured to said rock shaft.

a connecting rod axially slidably engaged with said crank arm and having a universal joint connection with said stud, means connected to rotate said loop, said jaws projecting oppositely from said loop beyond said line of pans in the retracted position of said carriage to over a supply station, and means for delivering articles to said supply station.

11. In an article grading machine having a plurality of grading devices with aligned pans arranged to grade and discharge articles of different grades, means for advancing articles along said line of pans comprising a frame supporting said devices and including a slide extending longitudinally along the line of said pans, a carriage slidably supported on said slide, a longitudinal rock shaft rotatably mounted in said carriage and secured in opposed thrust engagement with the carriage, a gear on said rock shaft, a pair of jaw operating shafts rotatably mounted on said carriage, gears on said operating shafts meshed with each other, the gears on said rock shaft being drivingly engaged with one of said operating shafts, jaw arms projecting from said operating shafts, elongated jaws with opposed faces carried on said jaw arms over said pans for lateral opening and closing motion with respect to articles on the pans, means supporting a horizontal rectangularly looped flexible drive member at one end of said line of pans, a stud carried by said looped member, a crank arm fixedly secured to said rock shaft, means forming a driving connection between said stud and said crank arm to angularly rock said arm and rock shaft and reciprocate said crank arm and carriage as said stud travels around said loop, means connected to rotate said loop, said jaws projecting oppositely from said loop beyond said line of pans in the retracted position of said carriage to over a supply station, and means for delivering articles to said supply station.

12. In an article grading machine having a plurality of grading devices with aligned pans arranged to grade and discharge articles of different grades, means for advancing articles along said line of pans comprising a frame supporting said devices and including a slide extending longitudinally along the line of said pans, a carriage slidably supported on said slide, a longitudinal rock shaft rotatably mounted in said carriage and secured in opposed thrust engagement with the carriage, a gear on said rock shaft, a pair of jaw operating shafts rotatably mounted on said carriage, gears on said operating shafts meshed with each other, the gears on said rock shaft being drivingly engaged with one of said operating shafts, jaw arms projecting from said operating shafts, elongated jaws with opposed faces carried on said jaw arms over said pans for lateral opening and closing motion with respect to articles on the pans, means supporting a horizontal rectangularly looped flexible drive member at one end of said line of pans, a crank arm fixedly secured to said rock shaft, means forming a driving connection between a point on said drive member and said crank arm to angularly rock said arm and rock shaft and reciprocate said crank arm and carriage as said point travels around said loop, means connected to rotate said loop, said jaws projecting oppositely from said loop beyond said line of pans in the retracted position of said carriage to over a supply station, and means for delivering articles to said supply station.

13. In a grading machine, the combination of a reciprocatingly mounted carriage, a support for a plurality of objects to be graded, coacting elongated jaws having opposed work gripping faces, a driving rock shaft mounted on said carriage, driven rock shafts mounted on said carriage and on which said jaws are mounted, said driven rock shafts being geared to said driving rock shaft to be simultaneously opened and closed, a series of aligned receivers disposed in alignment with said jaws to receive work translated by the jaws, and means for reciprocating said carriage and actuating said driving rock shaft comprising sprockets disposed in a rectangular group beyond the end of the stroke of said jaws, driving means for one of said sprockets, a chain trained upon said sprockets and provided with a knuckle member, a crank arm on said driving rock shaft, and a connecting rod telescopingly engaged with said arm and having a universal joint engagement with said knuckle member.

14. In a grading machine, the combination of a reciprocatingly mounted carriage, a support for a plurality of objects to be graded, coacting elongated jaws having opposed work gripping resilient faces, a driving rock shaft mounted on said carriage, driven rock shafts mounted on said carriage and on which said jaws are mounted, said driven rock shafts being geared to said driving rock shaft to simultaneously open and close said jaws, a series of aligned receivers disposed in alignment with said jaws to receive work translated by the jaws, and means for reciprocating said carriage and actuating said driving rock shaft comprising sprockets disposed in a rectangular group and a sprocket chain coacting therewith, and a crank arm on said driving rock shaft connected to said chain whereby the carriage is reciprocated and the rock shaft actuated at the ends of the carriage stroke.

15. The combination of a reciprocatingly mounted carriage, a driving rock shaft mounted on said carriage, and means for reciprocating said carriage and actuating said driving rock shaft comprising sprockets disposed in a rectangular group beyond the end of the forward stroke of said jaws, a chain trained upon said sprockets and provided with a knuckle member, a crank arm on said driving rock shaft, and a connecting rod telescopingly engaged with said arm and having a universal joint connection with said knuckle member.

16. The combination of a reciprocatingly mounted carriage, a driving rock shaft mounted on said carriage, and means for reciprocating said carriage and actuating said driving rock shaft comprising sprockets disposed in a rectangular group and a sprocket chain coacting therewith, a crank arm on said driving rock shaft connected to said chain whereby the carriage is reciprocated and the rock shaft actuated at the ends of the stroke of the carriage.

17. The combination of, a reciprocatingly mounted carriage, a driving rock shaft mounted on said carriage, and means for reciprocating said carriage and actuating said driving rock shaft at the ends of the stroke of the carriage comprising a driving member traveling in a rectangular path with spaced reaches of its travel parallel to the path of travel of the carriage and other spaced reaches transverse to the path of travel of the carriage, a crank arm on said driving rock shaft and a connecting rod telescopingly engaged with said crank arm and having a universal joint connection with said driving member.

References Cited in the file of this patent

UNITED STATES PATENTS

| | | |
|---|---|---|
| 1,577,627 | Webster | Mar. 23, 1926 |
| 1,959,237 | Hiscock | May 15, 1934 |
| 2,687,802 | Davis | Aug. 31, 1954 |
| 2,783,883 | Davis | Mar. 5, 1957 |